(12) United States Patent  (10) Patent No.: US 8,058,750 B2
Covaro et al.  (45) Date of Patent: Nov. 15, 2011

(54) DISCHARGE CYCLE COMMUNICATION

(75) Inventors: Mark Covaro, Sonoma, CA (US);
Gopakumar Parameswaran, Saratoga, CA (US)

(73) Assignee: Redwood Systems, Inc., Fremont, CA (US)

( * ) Notice: Subject to any disclaimer, the term of this patent is extended or adjusted under 35 U.S.C. 154(b) by 286 days.

(21) Appl. No.: 12/465,800

(22) Filed: May 14, 2009

(65) Prior Publication Data

US 2010/0289343 A1  Nov. 18, 2010

(51) Int. Cl.
*H01H 47/00* (2006.01)
*H01H 83/00* (2006.01)
*H02J 7/00* (2006.01)

(52) U.S. Cl. .................... 307/125; 307/DIG. 1

(58) Field of Classification Search ............ 307/1, 125, 307/DIG. 1; 340/310.11, 310.12, 310.13; 315/185 R, 186
See application file for complete search history.

(56) References Cited

U.S. PATENT DOCUMENTS

| | | | |
|---|---|---|---|
| 3,660,738 A | 5/1972 | Anderson et al. ............ 318/138 |
| 4,578,533 A | 3/1986 | Pierce ............................. 179/2 |
| 4,725,762 A | 2/1988 | Jagschitz ..................... 315/226 |
| 4,737,787 A | 4/1988 | Ito et al. .................... 340/870.18 |
| 4,740,952 A | 4/1988 | Vernieres et al. ............... 370/24 |
| 5,293,628 A | 3/1994 | Langan et al. ............... 395/550 |
| 5,396,555 A | 3/1995 | Shibata et al. ............... 379/412 |
| 5,627,833 A | 5/1997 | Bliven ......................... 370/464 |
| 5,684,826 A | 11/1997 | Ratner ......................... 375/222 |
| 5,793,754 A | 8/1998 | Houldsworth et al. ........ 370/276 |
| 5,798,913 A | 8/1998 | Tiesinga et al. ................. 363/21 |
| 5,905,406 A | 5/1999 | Sugden et al. ................ 329/312 |
| 6,097,761 A | 8/2000 | Bühring et al. ............... 375/257 |
| 6,144,292 A | 11/2000 | Brown ...................... 340/310.02 |
| 6,295,356 B1 | 9/2001 | De Nicolo .................... 379/413 |
| 6,348,780 B1 | 2/2002 | Grant ............................ 323/222 |
| 6,496,104 B2 | 12/2002 | Kline ....................... 340/310.01 |
| 6,535,983 B1 | 3/2003 | McCormack et al. ........ 713/310 |
| 6,549,120 B1 | 4/2003 | De Buda ................. 340/310.01 |
| 6,654,409 B1 | 11/2003 | Scott et al. .................... 375/220 |
| 6,853,173 B2 | 2/2005 | Caine et al. .................... 323/285 |
| 7,005,969 B2 | 2/2006 | Fisher et al. ............. 340/310.01 |

(Continued)

FOREIGN PATENT DOCUMENTS

EP  1 087 506 A2  3/2001

(Continued)

OTHER PUBLICATIONS

U.S. Appl. No. 12/790,038, filed May 28, 2010, Covaro et al.

(Continued)

*Primary Examiner* — Jared Fureman
*Assistant Examiner* — Carlos Amaya
(74) *Attorney, Agent, or Firm* — Brinks Hofer Gilson & Lione

(57) ABSTRACT

In one embodiment, a system may be provided that includes a circuit that is electrically coupled to a line. The circuit generates a direct current signal on the line, where the direct current signal has a period that includes a charge cycle and a discharge cycle. The circuit charges the line in the charge cycle and ceases to charge the line in the discharge cycle in order to generate the direct current signal. The line fails to fully discharge for at least a portion of the discharge cycle. To receive data from the line, the circuit detects a variation in a discharging of the line in the discharge cycle.

20 Claims, 11 Drawing Sheets

U.S. PATENT DOCUMENTS

| | | | |
|---|---|---|---|
| 7,012,505 B1 | 3/2006 | Arden | 340/310.01 |
| 7,102,490 B2 | 9/2006 | Flen et al. | 340/310.18 |
| 7,113,547 B2 | 9/2006 | Inoue et al. | 375/256 |
| 7,126,463 B2 | 10/2006 | Bauerle et al. | 340/453 |
| 7,279,855 B2 | 10/2007 | Tahara et al. | 318/46 |
| 7,327,222 B2 | 2/2008 | Peltonen | 340/310.11 |
| 7,369,629 B2 | 5/2008 | Umewaka | 375/334 |
| 2003/0043038 A1 | 3/2003 | Izadinia et al. | 340/568.2 |
| 2003/0090244 A1 | 5/2003 | Shenai et al. | 323/259 |
| 2005/0200317 A1 | 9/2005 | Novikov | 315/312 |
| 2005/0231133 A1* | 10/2005 | Lys | 315/291 |
| 2006/0038661 A1 | 2/2006 | Reinhold et al. | 340/310.11 |
| 2006/0049693 A1 | 3/2006 | Abraham et al. | 307/10.1 |
| 2006/0222089 A1 | 10/2006 | Dicky | 375/259 |
| 2007/0014304 A1 | 1/2007 | Wu et al. | 370/431 |
| 2007/0143508 A1* | 6/2007 | Linnman | 710/100 |
| 2007/0286305 A1 | 12/2007 | Saggini et al. | 375/272 |
| 2008/0224536 A1 | 9/2008 | Yamazaki | 307/1 |
| 2009/0086487 A1 | 4/2009 | Ruud et al. | 362/249.02 |
| 2010/0138363 A1 | 6/2010 | Batterberry et al. | 705/412 |
| 2010/0213759 A1 | 8/2010 | Covaro | 307/1 |
| 2010/0214082 A1 | 8/2010 | Covaro et al. | 340/310.12 |
| 2010/0237695 A1* | 9/2010 | Covaro et al. | 307/19 |

FOREIGN PATENT DOCUMENTS

| | | |
|---|---|---|
| JP | 60-140950 | 7/1985 |
| WO | WO 99/67880 | 12/1999 |

OTHER PUBLICATIONS

IRPLLED1 350mA to 1.5A High Voltage LED Driver using IRS2540, Source—www.irf.com, downloaded Feb. 17, 2009, pp. 1-29.

Pulse-width Modulation, Source—http://en.wikipedia.org/wiki/Pulse_width_modulation, dated Feb. 2009, pp. 1-6.

Duty Cycle, Source—http://en.wikipedia.org/wiki/Duty_cycle, dated Jan. 8, 2009, pp. 1-2.

Stefanutti, W., Mattavelli, P., Saggini, S., Panseri, L., Communication on Power Lines Using Frequency and Duty-Cycle Modulation in Digitally Controlled dc-dc Converters, IEEE, 2006, pp. 2144-2149.

Saggini, S., Stefanutti, W., Mattavelli, P., Garcea, G., Gihoni, M., Power Line Communication in dc-dc Converters Using Switching Frequency Modulation, IEEE, 2006, pp. 1595-1600.

Stephens, W.E., Banwell, T.C., Lalk, G.R., Robe, T.J., Young, K.C., Transmission of STS-3c (155 Mbit/sec) SONET/ATM Signals Over Unshielded and Shielded Twisted Pair Copper Wire, IEEE, 1992, pp. 170-174.

Aghajeri, S., Shafiee, H., Synchronization in OFDM Powerline Communication Systems in Presence of Narrowband Interferences, IEEE, 2003, pp. 359-362.

Santolaria, A., Balcells, J., González, D., Gago, J., Evaluation of Switching Frequency Modulation in EMI Emissions Reduction Applied to Power Converters, IEEE, 2003, pp. 2306-2311.

Schur, Romed, Speidel, Joachim, Angerbauer, Ralf, Reduction of Guard Interval by Impulse Compression for DMT Modulation on Twisted Pair Cables, IEEE, 2000, pp. 1632-1636.

Barton, Melbourne, Honig, Michael L., Optimization of Discrete Multitone to Maintain Spectrum Compatibility with Other Transmission Systems on Twisted Copper Pairs, IEEE, 1995, pp. 1558-1563.

Linear Regulator, www.wikipedia.org, Feb. 5, 2009.

U.S. Appl. No. 12/389,868, filed Feb. 20, 2009, Covaro et al.

X10 (industry standard), www.wikipedia.org, dated Oct. 4, 2007, pp. 1-7.

U.S. Appl. No. 12/536,231, filed Aug. 5, 2009, Covaro.

Office Action, dated May 19, 2011, pp. 1-14, U.S. Appl. No. 12/536,231, U.S. Patent and Trademark Office, Virginia.

* cited by examiner

US 8,058,750 B2

DISCHARGE CYCLE COMMUNICATION

TECHNICAL FIELD

The present disclosure relates generally to communication and, in particular, to communication and power transmission.

BACKGROUND

Twisted pair wiring is a form of wiring in which two conductors are wound together for the purposes of canceling out electromagnetic interference (EMI) from external sources and crosstalk between neighboring pairs. The two conductors may represent a line. Twisted pair wiring is the primary wire type for telephone usage.

Ethernet over twisted pair typically includes four or more lines of twisted pair wiring. Each one of the lines contains two conductors wound together. In some examples, networked devices connected to Ethernet over twisted pair have been configured to receive data over a first one of the lines and to receive power over a second one of the lines.

BRIEF SUMMARY

By way of introduction, the aspects described below include an apparatus, a system, and a method to communicate data over a line.

According to a first aspect, an apparatus may be provided that includes a circuit electrically coupled to a line. The circuit is configured to receive a direct current signal over the line, where the direct current signal has a period that includes a charge cycle and a discharge cycle. The direct current signal is generated from a charging of the line in the charge cycle and a cessation of the charging of the line in the discharge cycle. The line fails to fully discharge for at least a portion of the discharge cycle. For example, the line may fail to fully discharge for at least the portion of the discharge cycle due at least in part to a diode forward voltage drop across a diode coupled to the line. The circuit may close a switch in the discharge cycle to transmit data over the line, where the closure of the switch is configured to discharge the line to an extent greater than in absence of a closure of the switch.

In a second aspect, a system may be provided that includes a circuit that is electrically coupled to a line. The circuit generates a direct current signal on the line, where the direct current signal has a period that includes a charge cycle and a discharge cycle. The circuit charges the line in the charge cycle and ceases to charge the line in the discharge cycle in order to generate the direct current signal. The line fails to fully discharge for at least a portion of the discharge cycle. The circuit detects a variation in decay of charge on the line in the discharge cycle, where the variation is indicative of data received from the line In a third aspect, a method may be provided. A direct current signal may be received from a line, where the direct current signal has a period that includes a charge cycle and a discharge cycle. The direct current signal is generated from a charging of the line in the charge cycle and a cessation of the charging of the line in the discharge cycle. The line fails to fully discharge for at least a portion of the discharge cycle. Data may be transmitted over the line by altering a discharging the line in the discharge cycle.

The present invention is defined by the following claims, and nothing in this section should be taken as a limitation on those claims. Further aspects and advantages of the invention are discussed below in conjunction with the example embodiments.

BRIEF DESCRIPTION OF THE DRAWINGS

The components and the figures are not necessarily to scale, emphasis instead being placed upon illustrating the principles of the invention. Moreover, in the figures, like-referenced numerals designate corresponding parts throughout the different views.

DETAILED DESCRIPTION

Twisted pair wiring that includes two conductors may be less expensive than many other types of cabling, such as Ethernet cabling and 10 AWG (American wire gauge) building wiring. A single line that includes two conductors may carry both power and data between a power device and a load device, costing less than a configuration that includes a line with two conductors for the power and a different line with two conductors for the data. The power device may transmit power to the load device over the single line. Alternatively or additionally, the power device may transmit both power and data to the load device over the single line. The load device may transmit data to the power device over the single line. Thus, communication between the power device and the load device may be half-duplex or full-duplex. More than one line may connect the control and load devices.

For example, the load device may be a light-emitting diode (LED) fixture to provide lighting in a building. The power device may include a panel that controls lighting in the building. The LED fixture may be connected to the panel with twisted-pair wiring. The panel may transmit a request to the LED fixture for an identification of the type of load device while providing a low power signal to power at least a load communicator circuit in the LED fixture. In response, the load communicator circuit in the LED fixture may transmit a response indicating that the load device is the LED fixture. Thereafter, the panel may selectively transmit a higher power signal to the LED fixture in order to provide power for operation of the LED fixture. The higher power signal and/or control data sent to the LED fixture may switch the LED fixture on. Additionally or alternatively, the panel may vary the power signal or provide control data to the LED fixture to control the brightness of the LED fixture. In one example, the panel may read data from a sensor, which is located near the LED fixture and which is electrically coupled to the twisted-pair wiring. Alternatively or in addition, the panel may send data to the sensor to adjust the sensor response.

The LED fixture may include light-emitting diodes (LEDs) connected in series and powered over the single line. Each one of the LEDs may have a diode forward voltage drop, designated $V_d$. When the voltage across one of the diodes reaches $V_d$, the current may begin to flow through the diode. When the voltage across the diode is less than $V_d$, the current flowing through the diode may be negligible. Connected in series, the LEDs may have a total diode forward voltage drop, designated $V_d(total)$. The total diode forward voltage drop, $V_d(total)$, may equal the diode forward voltage drop, $V_d$, if one LED is connected to the line. Examples of the total diode forward voltage drop, $V_d(total)$, include 3 volts, 5 volts, 12 volts, and 60 volts.

Figure 1:
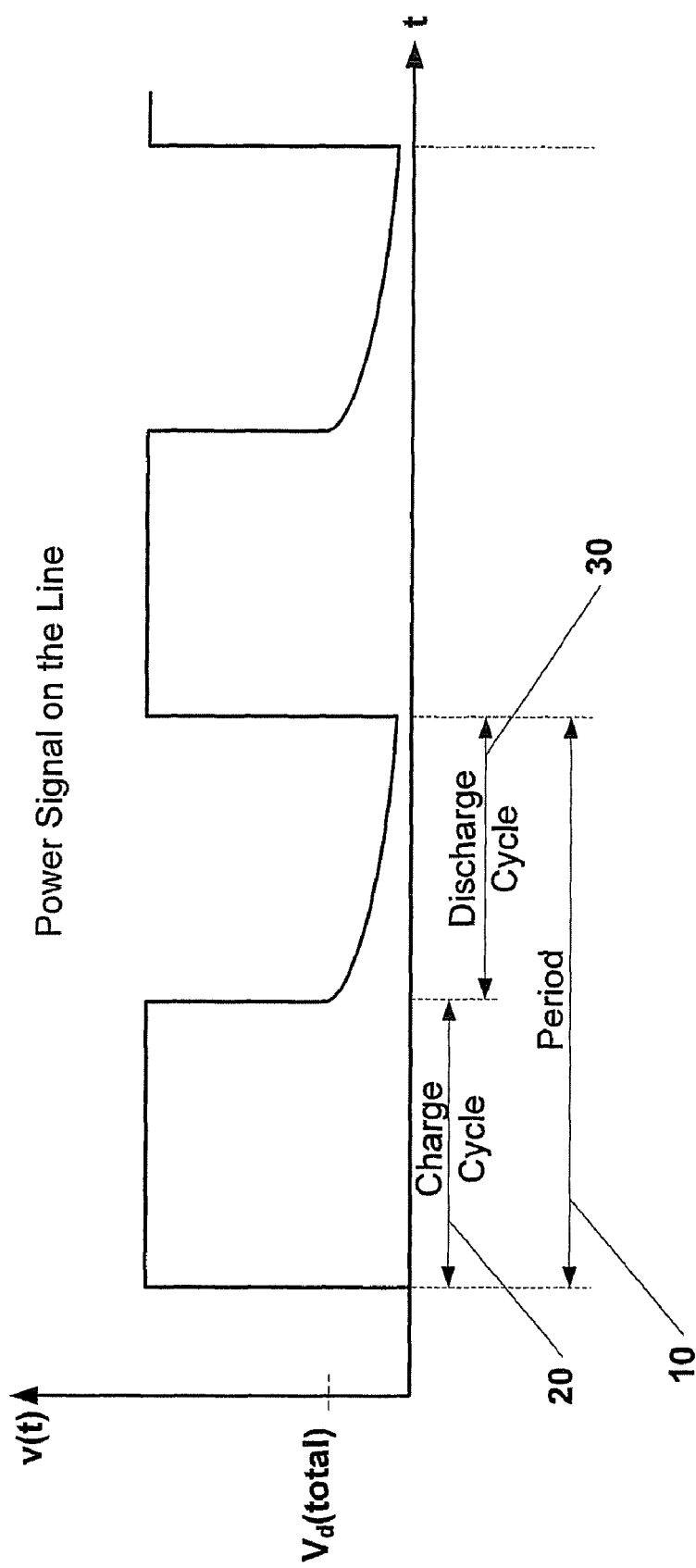
FIG. 1 illustrates an example of a power signal generated by the power device.

FIG. 1 illustrates an example of a power signal generated by the power device. A current or voltage source in the power device may generate the power signal carried over the single line. The power signal may be a periodic direct current (DC) waveform. Each period 10 of the power signal may include a charge cycle 20 and a discharge cycle 30. During the charge cycle 20, the power device is active and charges the line. During the discharge cycle 30, the power device is inactive, and does not charge or discharge the line. If the voltage on the line when the discharge cycle 30 begins is greater than the total diode forward voltage drop, $V_d(total)$, then the voltage on the line drops to $V_d(total)$. During the rest of the discharge cycle 30, the voltage on the line decreases at a rate determined by parasitic electrical losses in the power device, the line, and the load device. If the voltage on the line when the discharge cycle 30 begins is less than or equal to the total diode forward voltage drop, $V_d(total)$, then the voltage on the line may simply decrease at a rate determined by parasitic electrical losses during the discharge cycle 30. Consequently, the line may not fully discharge before the next charge cycle 20 begins. In one example, the diode or diodes may clamp the voltage on the line to approximately $V_d(total)$ during the charge cycle 20. In one example, the period 10 may be five milliseconds, where the charge cycle 20 is two milliseconds and the discharge cycle 30 is three milliseconds. Two milliseconds after the start of the period, the line voltage may drop to $V_d(total)$, such as 3 volts. Over the next three milliseconds of the discharge cycle 30, the line voltage may drop to 2.9 volts. In other examples, timing and line voltages may be different.

To communicate data from the load device to the power device, a switch may be closed at the load device, connecting the two conductors of the line and fully discharging the line during the discharge cycle 30. The power device may measure the voltage on the line and detect whether the voltage on the line drops to zero during the discharge cycle 30. For example, if the voltage on the line would not drop to zero if the switch is not closed during the discharge cycle 30, then detecting the line dropping to zero during the discharge cycle 30 detects a closing of the switch. Alternatively or additionally, the power device 118 may measure the voltage on the line and detect whether the voltage drops to zero at a predetermined time after the discharge cycle 30 begins. For example, if the line voltage after two milliseconds into the discharge cycle 30 would be two volts if the switch is not closed, then detecting the voltage dropping to zero after two milliseconds into the discharge cycle 30 detects a closing of the switch.

By alternatively closing and opening the switching over multiple discharge cycles 30, data may be communicated from the load device to the power device. For example, closing the switch during one of the multiple discharge cycles 30 may correspond to transmitting a binary value of one. Not closing the switch during one of the multiple discharge cycles 30 may correspond to transmitting a binary value of zero. Thus, over eight discharge cycles 30, the load device may transmit an eight-bit value, which is a byte.

Figure 2:
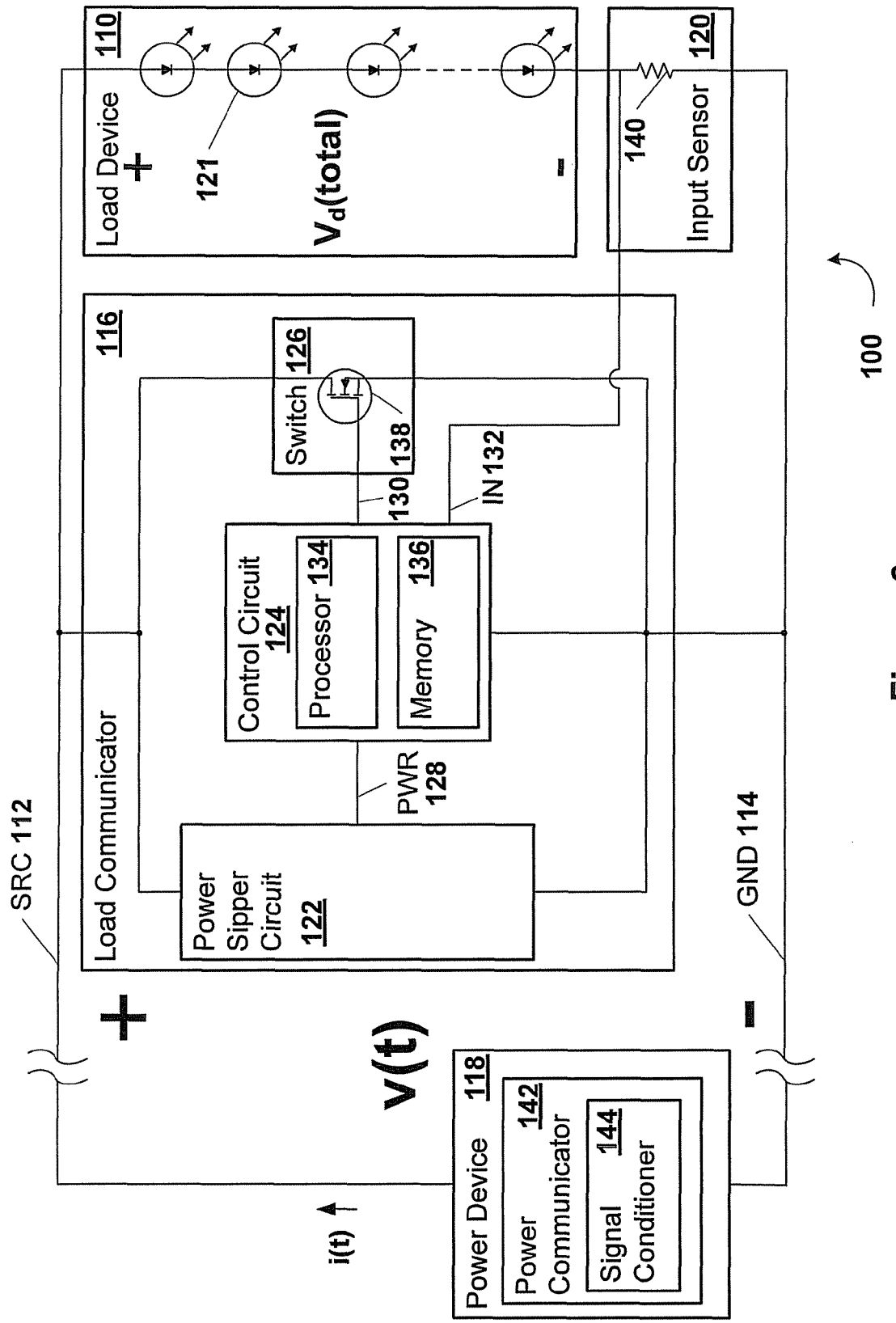
FIG. 2 illustrates one example of a system to communicate data via a discharge of a line.

FIG. 2 illustrates one example of a system 100 to communicate data via a discharge of a line providing power to a load device 110. The line includes two conductors, SRC 112 and GND 114, respectively. The system 100 may include the load device 110, a load communicator 116, a power device 118, and an input sensor 120. The system 100 may include additional, fewer, or different components. For example, the system 100 may not include the input sensor 120. In one example, the system 100 may include the load communicator 116 and the load device 110, but not the power device 118. In a second example, the system 100 may include the load communicator 116, but not the load device 110 and the power device 118. In a third example, the load device 110 may include the load communicator 116.

The power device 118 may be any device that generates a direct current (DC) signal on the line to power the load device 110. The direct current signal may be a direct current (DC) periodic waveform where each period 10 of the DC periodic waveform includes a charge cycle 20 and a discharge cycle 30. The power device 118 may include a voltage source or a current source to generate the DC periodic waveform. The period 10 or frequency of the DC periodic waveform may be altered over time. Examples of the power device 118 include a switched-mode power supply, an AC to DC (Alternating Current to Direct Current) converter, a DC to DC (Direct Current to Direct Current) converter, a fixed-frequency PWM converter, a variable-frequency quasi-resonant ZCS/ZVS (Zero-Current Switching/Zero-Voltage Switching) converter, a voltage converter, a current converter, a hysteretic converter, and a PWM buck converter. Other power sources may be used.

The charge cycle 20 includes a time period during which the voltage source or the current source charges the line. The discharge cycle 30 includes a time period during which the voltage source or the current source does not charge the line. In one example, the power device 118 may include any voltage or current source that has a relatively high impedance when turned off during the discharge cycle 30. In a second example, the power device 118 may include a voltage source and a diode configured so that current does not flow back into the power device 118 during the discharge cycle 30.

The power device 118 may be electrically coupled to the line. For example, the power device 118 may be electrically coupled to the SRC 112 and the GND 114. Like the power device 118, the load device 110 may also be electrically coupled to the line. For example, the load device 110 may be electrically coupled to the SRC 112 and the GND 114. In the example illustrated in FIG. 2, the load device 118 is electrically coupled in series with the input sensor 120 to the SRC 112 and the GND 114. Additional devices, such as other load devices, may also be electrically coupled to the line.

The load device 110 may be any device that may be powered at least in part by the power device 118. Examples of the load device 110 include a LED, a switch, a network device, a LCD (Liquid Crystal Display) touch screen, a dimmer control, a motion detector, a photosensor, a brightness sensor, and any other device or combination of devices suitable to receive power from the power device 118.

The load device 110 may include one or more diodes 121 configured in a circuit to add at least one diode forward voltage drop, $V_d$(total), across the load device 110. In one example, the load device 110 may be an LED fixture. In a second example, the load device 110 may be any diode protected circuit. In a third example, the load device 110 may any device that draws current from the line at a rate that prevents the line voltage from fully discharging during a portion of the discharge cycle 30. For example, a transistor-based load may be used. In a fourth example, the load device 110 may have a resistance large enough that the rate at which the load device 110 draws current prevents the line voltage from fully discharging during a portion of the discharge cycle 30.

The load communicator 116 may be a circuit configured to discharge the line during the discharge cycle 30 of the DC periodic waveform in order to transmit data over the line from where the line is coupled to the load device 110. The load communicator 116 may be electrically coupled to the SRC 112 and the GND 114. The load communicator 116 may include a power sipper circuit 122, a control circuit 124, and a switch 126.

The power sipper circuit 122 may be any circuit configured to store power received on the line and generate a regulated DC power signal 128 to power the control circuit 124. The power sipper circuit 122 may be electrically coupled to the SRC 112 and the GND 114 to receive power over the line. In an alternative example, the load communicator 116 may not include the power sipper circuit 122. In a different example, the control circuit 124 may be powered by an alternative power source, such as a solar cell or battery, instead of or in addition to the power sipper circuit 122.

The control circuit 124 may be any circuit configured to communicate data over the line by altering the discharge of the line during the discharge cycle 30. For example, the control circuit 124 may send an on/off signal 130 to the switch 126 to control whether the switch 126 is open or closed. The switch 126 may be electrically coupled between the SRC 112 and the GND 114. When the switch 126 is closed, the SRC 112 and the GND 114 are electrically connected and the line is discharged to a zero, ground or other potential of the GND 114. In one example, the control circuit 124 may additionally receive an input signal 132 from the input sensor 120 in order to receive data sent over the line.

In one example, the control circuit 124 may include a processor 134 and a memory 136. The processor 134 may be in communication with the memory 136. The processor 134 may also be in communication with other components, such as the switch 126.

The memory 136 may be any now known, or later discovered, data storage device. The memory 136 may be a non-volatile and/or volatile memory, such as a random access memory (RAM), a read-only memory (ROM), an erasable programmable read-only memory (EPROM), or flash memory. The memory 136 may include an optical, magnetic (hard-drive) or any other form of data storage device.

The processor 134 may be a general processor, central processing unit, server, application specific integrated circuit (ASIC), digital signal processor, field programmable gate array (FPGA), digital circuit, analog circuit, or combinations thereof. The processor 134 may be one or more devices operable to execute computer executable instructions or computer code embodied in the memory 136 or in other memory to implement the functionality of the control circuit 124. The computer code may be written in any computer language now known or later discovered, such as C++, C#, Java, Pascal, Visual Basic, Perl, HyperText Markup Language (HTML), JavaScript, assembly language, and any combination thereof. In one example where the processor 134 is an FPGA, the control circuit 124 may not include the memory 136.

The switch 126 may include a transistor 138 or any other component that is configured to selectively couple or decouple two nodes of the switch 126 based on the on/off signal 130. Examples of the switch 126 include a metal-oxide-semiconductor field-effect transistor (MOSFET), an insulated gate field effect transistor (IGFET), a bipolar transistor, a PNP bipolar junction transistor, and an NPN bipolar junction transistor. In one example, the two nodes of the switch 126 may be connected to the SRC 112 and the GND 114, respectively. Additionally or alternatively, one or more of the two nodes of the switch 126 may be coupled to additional components, such as a diode.

The input sensor 120 may be any component that may detect the current that flows through the load device 110. For example, the input sensor 120 may include a resistive element 140, such as a resistor. In one example, the resistive element 140 may be one ohm. In other examples, the resistive element 140 may have a different resistance. The higher the current flowing through the load device 110, the higher the voltage drop is across the resistive element 140. In one example, the input sensor 120 may be included in the load device 110.

Alternatively, the input sensor 120 may be any component that detects the current that flows through the line. For example, the input sensor 120 may include an input node and an output node, where the input node is electrically coupled to the SRC 112 and the output node is electrically coupled to the load communicator 116. Current flowing through the SRC 112 may flow through the input sensor 120 before flowing through the load communicator 116. In one example, the load device 110 may be electrically coupled to the output node of the input sensor 120 instead of to the SRC 112. Thus, the current flowing through the SRC 112 may flow through the input sensor 120 before flowing through either the load communicator 116 or the load device 110. In one example, the control circuit 124 may measure the voltage drop across the resistive element 140 in the input sensor 120 to determine the amount of current flowing through the load communicator 116, the load device 110, or both. If the resistance of the resistive element 140 is small enough, the voltage across the resistive element 140 and the power consumption of the resistive element 140 may be insubstantial. For example, the resistance may be selected so that the voltage across the resistive element 140 is on the order of 50 mV. The voltage drop across the resistive element 140 may be amplified for sensing purposes.

In one example, the power device 118 may include a power communicator 142. The power communicator 142 may be any circuit configured to receive data from the load communicator 116 through detection of a voltage drop on the line during the discharge cycle 30. For example, the power communicator 142 may include an operational amplifier configured to measure the line voltage, v(t), over time. Alternatively or in addition, the power communicator 142 may include a comparator configured to compare the line voltage with a determined voltage. In one example, the power communicator 142 may include a processor and a memory, like the processor 134 and the memory 136 included in the control circuit 124 of the load communicator 116. In one example, the power communicator 142 may also be configured to transmit data to the load communicator 116 as described later below. In an alternative example, the power communicator 142 may not be included in the power device 118 and, instead, be electrically coupled in parallel with the power device 118.

In one example, the power communicator 142 may include a signal conditioner 144. The signal conditioner 144 may be any circuit configured to generate a conditioned signal that indicates whether the line is discharged. For example, the conditioned signal may be a digital signal that is high unless the line is discharged, and then the conditioned signal is low until the next charge cycle 20. In an alternative example, the conditioned signal may be a digital signal that is low unless the line is discharged, and then the conditioned signal goes high until the next charge cycle 20. In one example, the signal conditioner 144 may include a set-reset (SR) flip-flop, where one of the outputs of the SR flip-flop is the conditioned signal. In a second example, the signal conditioner 144 may include a processor and a memory or be implemented using the processor and the memory of the power communicator 142. The processor of the power communicator 142 and/or the signal conditioner 144 may include circuitry for analog signal processing.

The control circuit 124 may be designed to minimize current and power demands on the power sipper circuit 122. Even if the power device 118 is not powering the load device 110 during operation of the system 100, the power device 118 may still send a pulse wave on the line to sufficiently power the power sipper circuit 122, which in turn powers the load communicator 116. In one example, the pulse wave may have a pulse-width on the order of a tenth of a percent of the waveform period.

Figure 3:
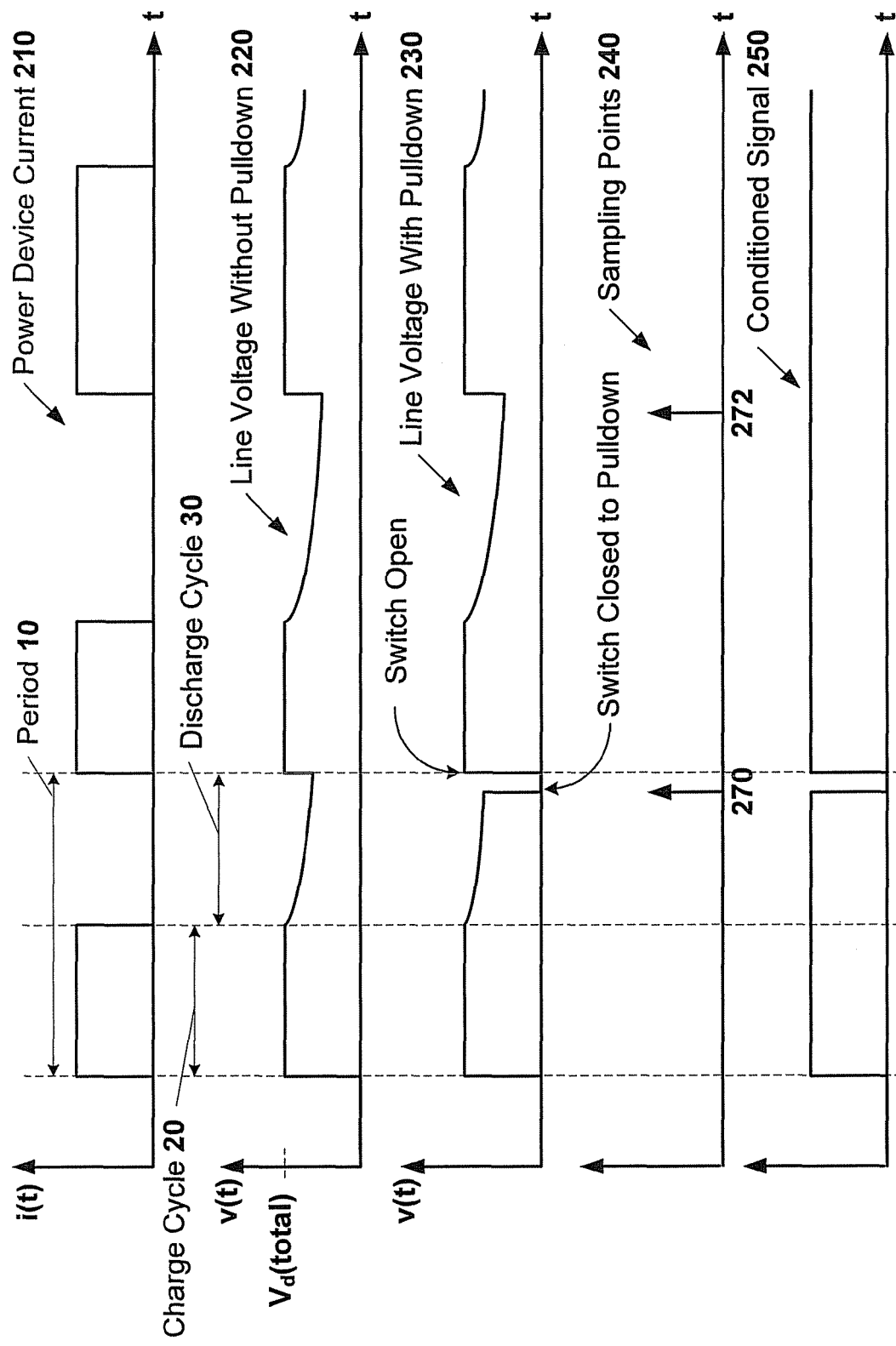
FIG. 3 illustrates example waveforms of signals in a system used to communicate data by discharging the line.

FIG. 3 illustrates example waveforms of signals in the system 100 used to communicate data by discharging the line. A first example waveform 210 is of current, i(t), generated by the power device 118 to charge the line. A second example waveform 220 is of the line voltage, v(t), without the load communicator 116 discharging the line. A third example waveform 230 is of the line voltage, v(t), when the control circuit 124 discharges the line by closing the switch 126 during the discharge cycle 30. A fourth example waveform 240 indicates when the power communicator 142 may sample the line voltage, v(t), in order to determine whether the control circuit 124 has discharged the line. A fifth example waveform 250 is of the conditioned signal generated by the signal conditioner 144. In alternate examples, the waveforms may be different from those illustrated in FIG. 3. For example, the waveforms may have different forms, periods, amplitudes, charging cycles, discharging cycles, or other characteristics than illustrated in FIG. 3.

The first example waveform 210 is a pulse wave. The pulse wave has the period 10 and each period 10 includes both the charge cycle 20 and the discharge cycle 30. In the example illustrated in FIG. 3, the period of the pulse wave is modified over time.

The second example waveform 220 of the voltage on the line is of the voltage, v(t), when the switch 126 is open and the power device 118 generates the current, i(t) illustrated in the first waveform 210. The voltage v(t), as illustrated in the second example waveform 220, remains at a constant amplitude during the charge cycle 20, and drops during at least a portion of the discharge cycle 30. With v(t) less than $V_d$(total), current does not flow freely through the load device 110. Consequently, v(t) drops during the discharge cycle 30 at a rate determined by the parasitic loses in the load device 110, the load communicator 116, the line, the power device 118, and any other device electrically coupled to the line. In the next charge cycle 20, v(t) returns to the constant amplitude. In the example illustrated in FIG. 3, the rate of discharge through the load device 110 prevents full discharge during the discharge cycle 30.

The third example waveform 230 of the line voltage illustrates the voltage, v(t), when the load communicator 116 discharges the line by closing the switch 126 during one of the discharge cycles 30 of the pulse wave illustrated in the first waveform 210. When the control circuit 124 of the load communicator 116 closes the switch 126, the voltage v(t) may be pulled down to zero. The control circuit 124 may reopen the switch 126 and the voltage v(t) will remain zero until the power device 118 starts to charge the line again at the next charge cycle 20.

The fourth example waveform 240 illustrates a first time 270 and a second time 272, each for a respective one of two discharge cycles 30, when the power communicator 142 may sample v(t) to determine whether the load communicator 116 has discharged the line. The power communicator 142 may determine whether the load communicator 116 discharged the line during one or more of the discharge cycles 30 by measuring the voltage, v(t), on the line. For example, the power communicator 142 may sample v(t) after a predetermined portion of the discharge cycle 30 has passed. In one example, the predetermined portion of the discharge cycle 30 may be a determined period of time after the charge cycle 20 ends. In one example, the predetermined portion of the discharge cycle 30 may be after ninety-five percent of the discharge cycle 30 has passed.

Because the parasitic losses on the line may depend on the configuration of the system 100, the power communicator 142 and the load communicator 116 may conduct a test sequence to determine the predetermined portion of the discharge cycle 30. For example, the power communicator 142 may transmit information to the load communicator 116 indicating the test sequence is to start a measurement phase. During the measurement phase, the load communicator 116 may refrain from discharging the line. During the measurement phase, the power communicator 142 and/or the load communicator 116 may determine a time in the discharge cycle 30 when the line voltage is non-zero. The determined time may subsequently be considered a predetermined time in the portion of the discharge cycle 30 when the line is not fully discharged. The load communicator 116 may discharge the line at the predetermined time to transmit data to the power device 118. Conversely, the power communicator 142 may sample or measure the line voltage on or after the predetermined time to determine whether the load communicator 116 has discharged the line.

The fifth example waveform 250 is of one example of the conditioned signal generated by the signal conditioner 144. The signal conditioner 144 may generate the conditioned signal based on whether the power communicator 142 has detected the discharge of the line. In the illustrated example of the conditioned signal, the conditioned signal is high until the discharge of the line is detected. Thereafter, the conditioned signal is low until the next charge cycle 20 begins. When the next charge cycle 20 begins, the conditioned signal is high again. The power communicator 142 may further process the conditioned signal to receive the data transmitted from the load communicator 116. The conditioned signal may facilitate the receipt of the data transmitted. In one example, however, the power communicator 142 may not generate the conditioned signal or the conditioned signal may be maintained low until a non-zero discharge is read in a subsequent discharge cycle.

Figure 4:
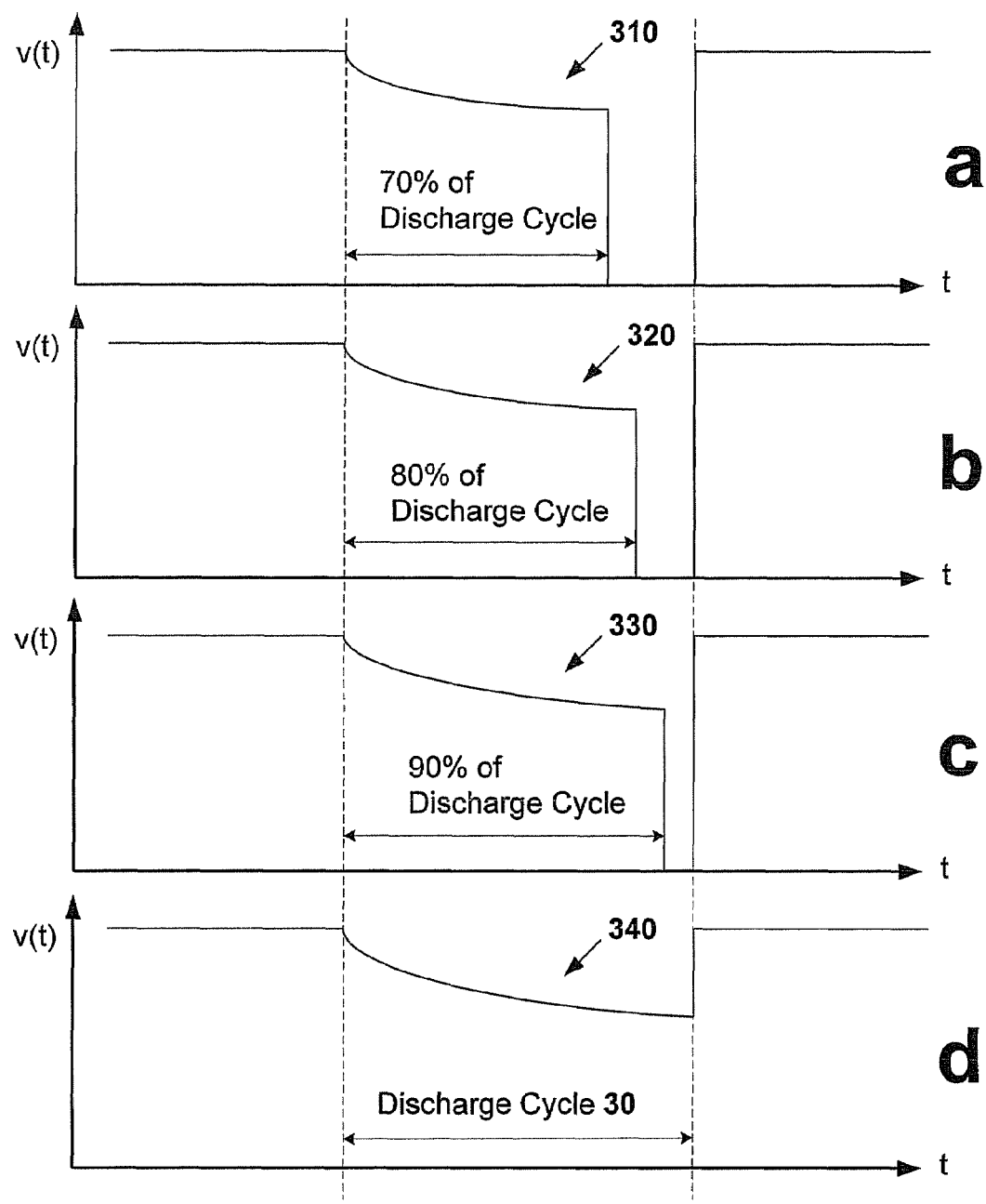
FIG. 4 illustrates an example of transmitting a two-bit encoded value with one discharge by timing the discharge of the line.

FIG. 4 illustrates an example of transmitting a two-bit encoded value with one discharge by timing of the discharge of the line. FIG. 4 illustrates four different possible waveforms, 310, 320, 330, and 340, of v(t). Each one of the possible waveforms, 310, 320, 330, and 340, is individually designated a, b, c, and d, respectively. Each one of the possible waveforms, 310, 320, 330, and 340 corresponds to one of four possible states. Each one of the four possible states may correspond to a respective one of four different two-bit encoded values.

For each one of the waveforms designed a, b, and c, the load communicator 116 discharges the line at different times in the discharge cycle 30 than the others waveforms. For example, in waveform a 310, the load communicator 116 discharges the line after 70 percent of the discharge cycle 30 has elapsed. In waveform b 320, the load communicator 116 discharges the line after 80 percent of the discharge cycle 30 has elapsed. In waveform c 330, the load communicator 116 discharges the line after 90 percent of the discharge cycle 30 has elapsed. In waveform d 340, the load communicator 116 does not discharge the line during the discharge cycle 30.

Table 1 below illustrates one example mapping between the four states and the two-bit encoded value. Any alternate mapping may be used. For example, states 1, 2, 3, and 4 may correspond to binary values 00, 01, 10, and 11, respectively.

TABLE 1

| State | Waveform | Time of Discharge | Binary Value |
|---|---|---|---|
| 1 | a | After 70% of Discharge Cycle | 11 |
| 2 | b | After 80% of Discharge Cycle | 10 |
| 3 | c | After 90% of Discharge Cycle | 01 |
| 4 | d | No Discharge | 00 |

Any number of different states may be represented by discharging at n different times in the discharge cycle 30. The different states may correspond to an encoded binary value and/or any other value or symbol. By representing different states using different discharge timings, the throughput of the system 100 may be increased.

Figure 5:
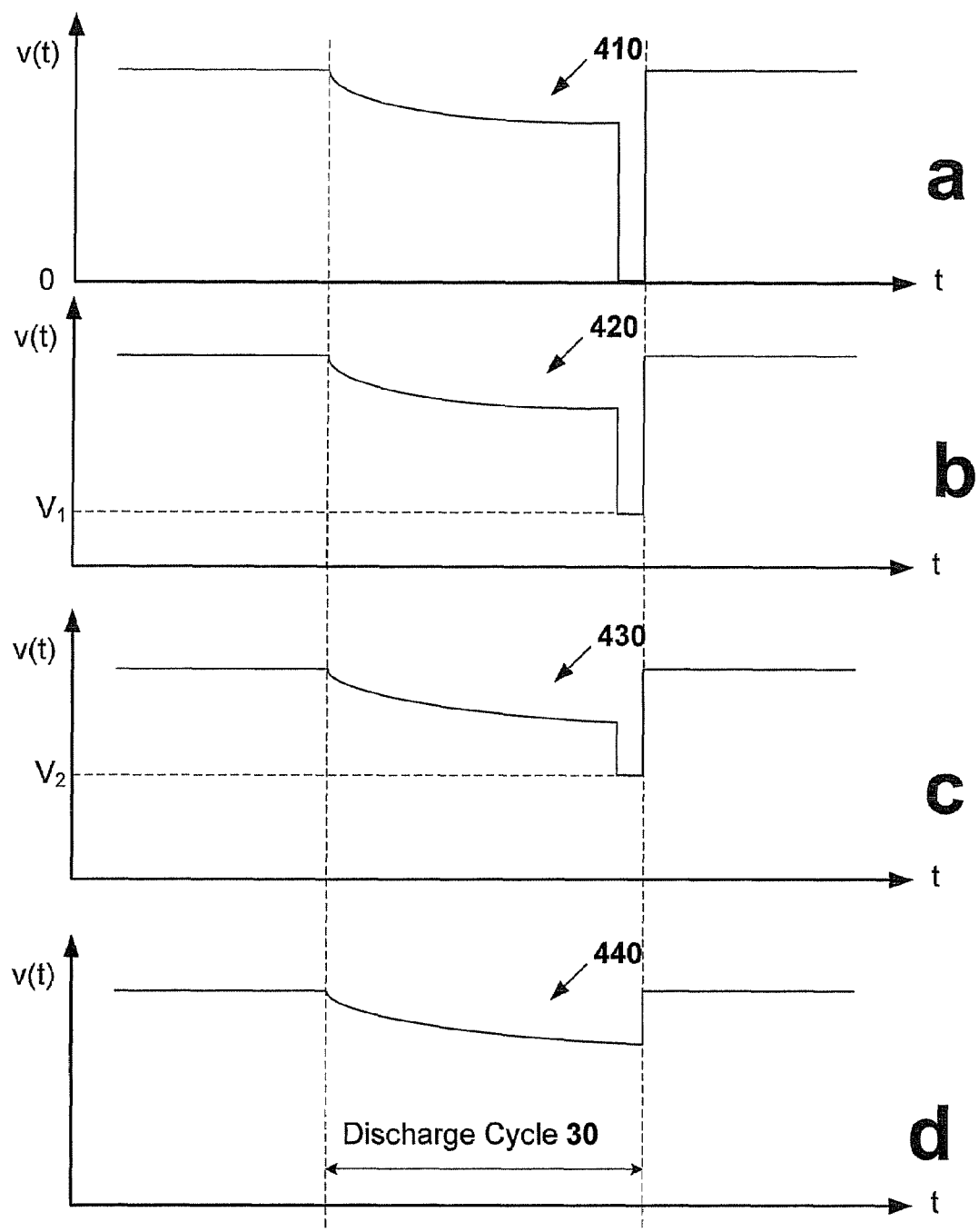
FIG. 5 illustrates an example of transmitting a two-bit encoded value with one discharge by discharging the line to a respective one of multiple predetermined voltages.

FIG. 5 illustrates an example of transmitting a two-bit encoded value with one discharge by discharging the line to a respective one of three predetermined voltages. In one example, the predetermined voltages may be absolute voltages. In another example, the predetermined voltages may be relative voltages to a base voltage determined during a test sequence. FIG. 5 illustrates four different possible waveforms, 410, 420, 430, and 440, of the line voltage, v(t). Each one of the possible waveforms, 410, 420, 430, and 440, is individually designated a, b, c, and d, respectively. Each one of the possible waveforms, 410, 420, 430, and 440, corresponds to one of four possible states. Each one of the states may correspond to a two-bit encoded value.

For each one of the waveforms designed a, b, and c, the load communicator 116 discharges the line to a different predetermined voltage than for the other waveforms. For example, in waveform a 410, the load communicator 116 discharges the line to zero volts. In waveform b 420, the load communicator 116 discharges the line to $V_1$ volts. In waveform c 430, the load communicator 116 discharges the line to $V_2$ volts. In waveform d, the load communicator 116 does not discharge the line during the discharge cycle 30.

Table 2 below illustrates one example mapping between the four states and the two-bit encoded value. Any alternate mapping may be used. For example, states 1, 2, 3, and 4 may correspond to binary values 00, 01, 10, and 11, respectively.

TABLE 2

| State | Waveform | Predetermined Voltage | Binary Encoded Value |
|---|---|---|---|
| 1 | a | zero | 11 |
| 2 | b | $V_1$ volts | 10 |
| 3 | c | $V_2$ volts | 01 |
| 4 | d | No Discharge | 00 |

Any number of different states may be represented by discharging to n different voltages per discharge cycle 30. The different states may correspond to an encoded binary value and/or any other value or symbol. By representing different states using different discharge voltages, the throughput of the system 100 may be increased.

Figure 6:
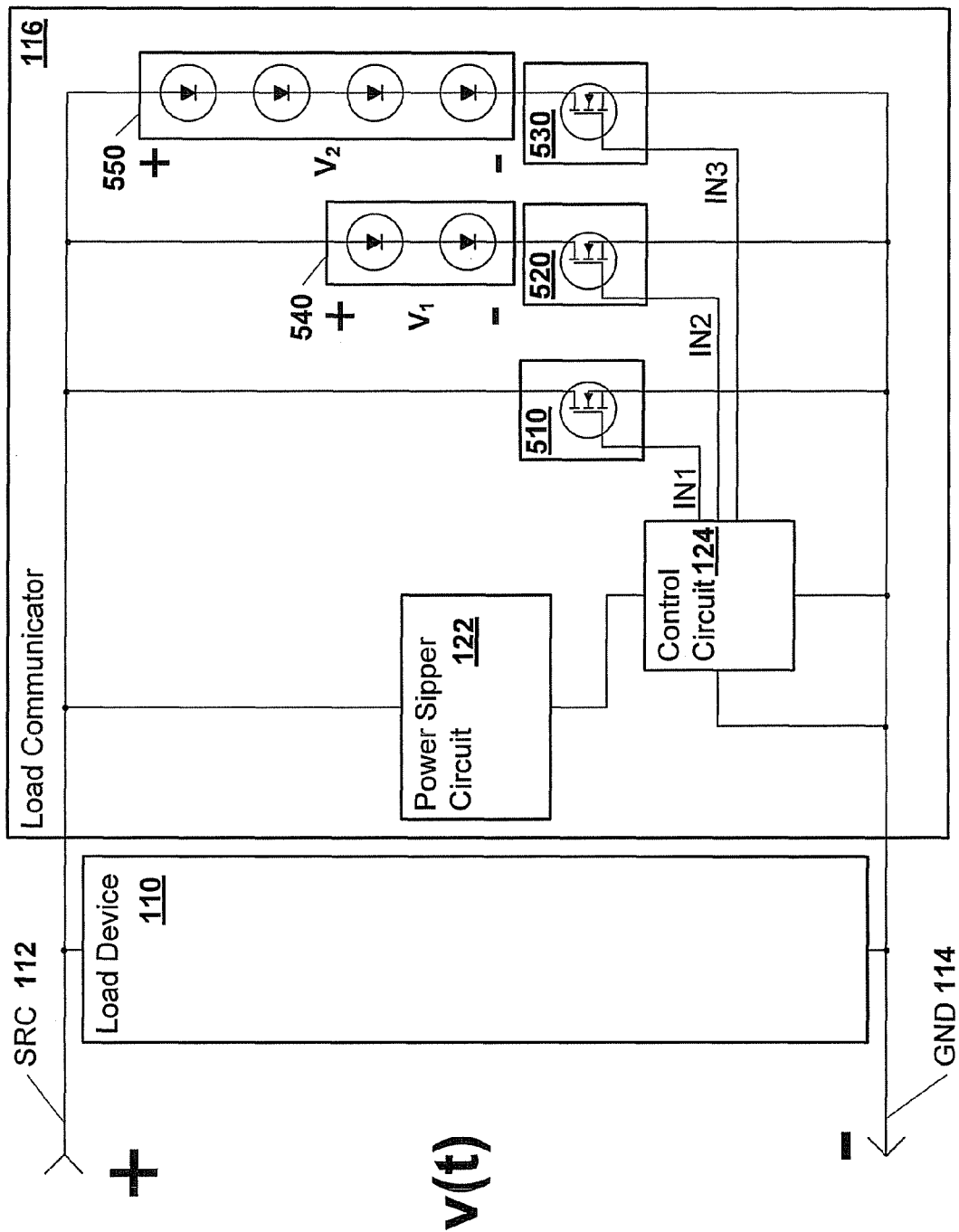
FIG. 6 illustrates an example of a load communicator configured to discharge to a respective one of three predetermined voltages during the discharge cycle.

FIG. 6 illustrates an example of the load communicator 116 configured to discharge to a respective one of three unique voltages during the discharge cycle 30. For example, the three unique voltages may be zero volts, $V_1$ volts, and $V_2$ volts.

Instead of including the one switch 126 as illustrated in FIG. 2, the load communicator 116 includes three switches 510, 520, and 530. The switches 510, 520, and 530 may be any component configured to electrically couple or decouple two conductors based on a switch signal, IN1, IN2, or IN3, received on a third conductor. Examples of the switches 510, 520, and 530 include MOSFETs, IGFETs, bipolar transistor, NPN and/or PNP bipolar junction transistors, or any other transistors. A first one 510 of the switches may be electrically coupled to the SRC 112 and the GND 114, respectively. When the switch signal IN1 sent to the first one of the switches 510 is on, the first one 510 of the switches fully discharges the line and drops the line voltage to zero volts.

In contrast to the first one 510 of the switches, each one of the second switch 520 and third switches 530 is electrically coupled in series with a respective one of two diode arrays 540 and 550 between the SRC 112 and the GND 114 or other potential sources. Each one of the two diode arrays 540 and 550 includes a number of diodes connected in series. The total diode forward voltage drop across each one of the two diode arrays 540 and 550 is different from the other one of the diode arrays 540 and 550. In particular, the total diode forward voltage drop across each one of the two diode arrays 540 and 550 corresponds to $V_1$ volts and $V_2$ volts, respectively.

When the switch signal IN2 to the second switch 520 is on, the charge on the line flows as current through the first diode array 540 until the line voltage reaches $V_1$ volts. The one or more diodes in the first diode array 540 then prevent further discharge of the line and the line voltage remains at $V_1$ volts. Similarly, when the switch signal SN3 sent to the third switch 530 is on, the charge on the line flows as current through the second diode array 550 until the line voltage reaches $V_2$ volts. The one or more diodes in the second diode array 550 then prevent further discharge of the line and the line voltage remains at $V_2$ volts.

When the control circuit 124 is to discharge the line during the discharge cycle 30, the control circuit 124 determines which of the three switches 510, 520, and 530 should receive the switch signal IN1, IN2, and IN3 to close the respective switch and discharge the line. The control circuit 124 determines which of the three switches 510, 520, and 530 should receive the switch signal IN1, IN2, and IN3 based on the predetermined voltage to which the line is to be discharged. The predetermined voltage corresponds to one of the possible states to be transmitted over the line. By discharging the line in subsequent discharge cycles, the control circuit 124 may transmit multiple binary encoded values over the line.

Alternatively or in addition to the diode arrays 540 and 550, other devices may be used. For example, voltage references, Zener diodes, $V_{BE}$ multipliers, or any other device or combination of devices that provides a predicable voltage drop.

In an alternative example, at least n number of states may be represented by both discharging to any one of q different voltages per discharge cycle 30 and by discharging at any one of p different times of the discharge cycle, where n=q*p+1. Because the lack of discharge during the discharge cycle 30 may represent one state, n=q*p+1 instead of n=q*p. For example, five states may be represented by both discharging to a respective one of two different voltages, $V_1$ and $V_2$ volts, per discharge cycle 30 and discharging at a respective one of two different times in the discharge cycle, 70% and 90% of the discharge cycle 30. For example, one of the five states may be represented by discharging to $V_1$ volts after 70% of the discharge cycle 30 has passed. A second one of the five states may be represented by discharging to $V_2$ volts after 90% of the discharge cycle 30 has passed.

Alternatively, additional states may be represented by discharging more than once during one discharge cycle 30 and by discharging to different voltages each time. For example, six states may be represented by both discharging to a respective one of two different voltages, $V_1$ and $V_2$ volts, and discharging at a respective one or more of two different times of the discharge cycle 30, $t_1$ and $t_2$. For example, $t_1$ and $t_2$ may be 70% and 90% of the discharge cycle 30, respectively, and $V_1$ may be less than $V_2$. Table 3 below illustrates an example of how the six states may be represented.

TABLE 3

| State | Line Voltage after Discharge at | |
|---|---|---|
| | $t_1$ | $t_2$ |
| 1 | $V_1$ | $V_1$ |
| 2 | $V_2$ | $V_2$ |
| 3 | $V_2$ | $V_1$ |
| 4 | No Discharge | $V_1$ |
| 5 | No Discharge | $V_2$ |
| 6 | No Discharge | No Discharge |

Figure 7:
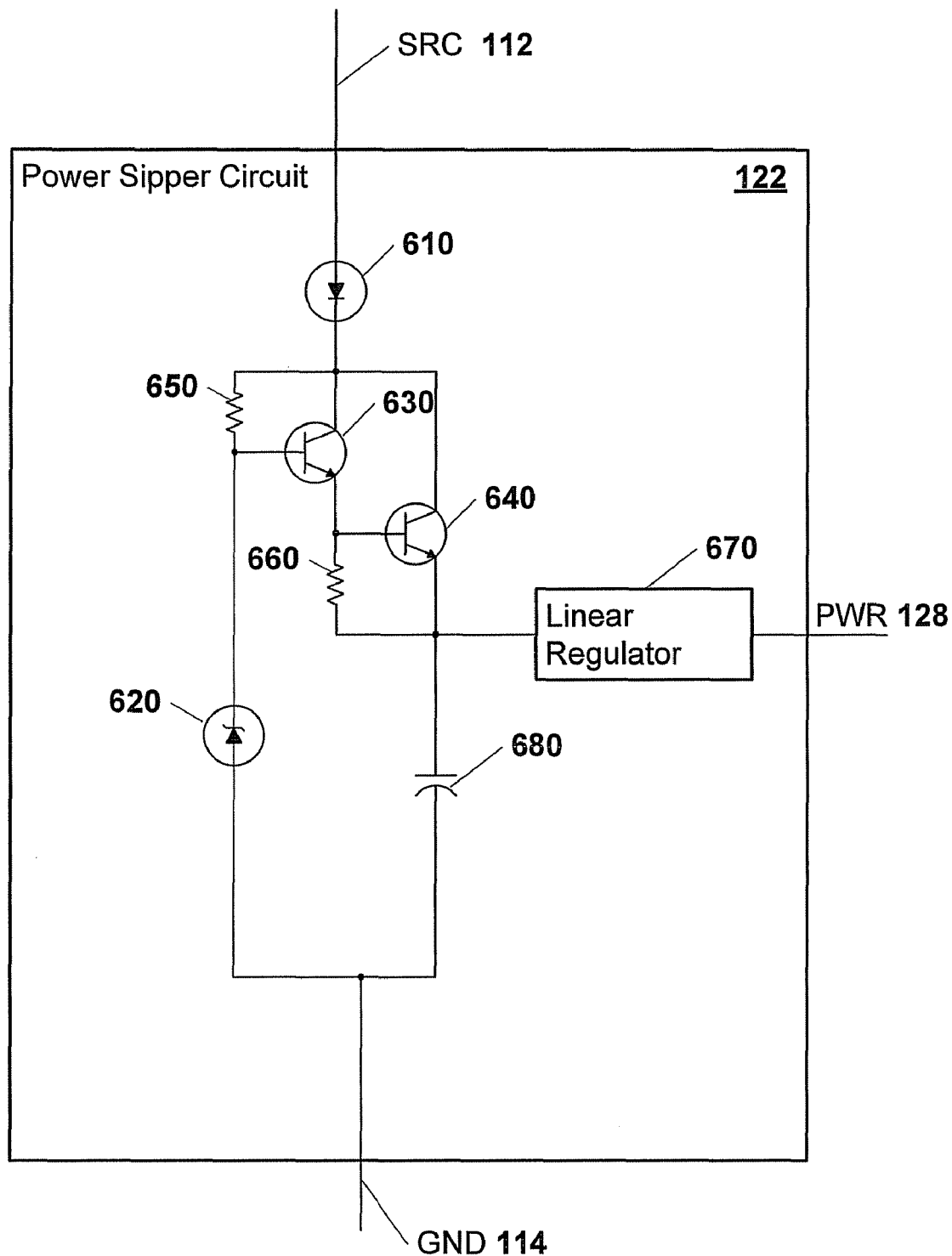
FIG. 7 illustrates an example implementation of a power sipper circuit.

FIG. 7 illustrates an example implementation of the power sipper circuit 122. As mentioned above, the power sipper circuit 122 may be any circuit configured to store power received on the line and generate the regulated DC power signal 128 to power the control circuit 124.

The example power sipper circuit 122 illustrated in FIG. 7 includes a protection diode 610, a Zener diode 620, a first transistor 630, a second transistor 640, a first resistive element 650, a second resistive element 660, a linear regulator 670, and a capacitive element 680. In alternative examples, the power sipper circuit 122 may include additional, fewer, or different components. For example, a Darlington transistor may be substituted for the first transistor 630 and the second transistor 640. In one example, the power sipper circuit 122 may not include the protection diode 610.

The protection diode 610 may be any component that permits current to flow in one direction but not the other. The Zener diode 620 may be any component that permits current to flow in one direction, but also in the reverse direction if the voltage across the component is larger than a breakdown voltage.

The first transistor 630 and the second transistor 640 may be any transistors, such as NPN bipolar junction transistors. The first resistive element 650 and the second resistive element 660 may be any component having an electrical resistance, such as a resistor. The capacitive element 680 may be any component having a capacitance, such as a capacitor. In one example, the Zener diode 620 may have a breakdown voltage of 8.2 volts, the first resistive element 650 may have a resistance of 470 Kohms, the second resistive element 660 may have a resistance of 10 Kohms, and the capacitive element 680 may have a capacitance of 10 μF. In alternative examples, the components may have different characteristics.

The linear regulator 670 may be a voltage regulator based on an active device that behaves as a variable resistor, continuously adjusting a voltage divider network in order to maintain a constant output voltage. Examples of the linear regulator 670 include series regulators and shunt regulators.

The anode of the protection diode 610 is connected to the SRC 112 to prevent current from flowing from the power sipper circuit 122 to the SRC 112. The collector of the first transistor 630 and the collector of the second transistor 640 are connected to the cathode of protection diode 610.

The base of the first transistor 630 is connected to the first end of the first resistive element 650, where the second end of the first resistive element 650 is connected to the cathode of the protection diode 610. The base of the first transistor 630 is also connected to the cathode of the Zener diode 620, where the anode of the Zener diode 620 is connected to the GND 114.

The emitter of the first transistor 630 is connected to the base of the second transistor 640 and to the first end of the second resistive element 660. The second end of the second resistive element 660 is connected to the emitter of the second transistor 640.

The emitter of the second transistor 640 is also connected to the first end of the capacitive element 680. The second end of the capacitive element 680 is connected to the GND 114. The emitter of the second transistor 640 is additionally connected to an input of the linear regulator 670. An output of the linear regulator 670 carries the regulated DC power signal 128 to the control circuit 124.

In one example, the power communicator 142 may transmit data to the load communicator 116. For example, the power communicator 142 may transmit data over the line to the load communicator 116 as part of a signal to deliver power to the load device 110.

In addition to the load communicator 116 transmitting data to power device 118, the power device 118 may transmit data to the load communicator 116. The power device 118 may generate the signal to deliver power to the load device 110 and control the amount of power delivered through pulse-width modulation (PWM) of the signal and/or through amplitude modulation of the signal. PWM of the signal may include the modulation of the duty cycle of the signal in order to vary the amount of power delivered. The duty cycle is the fraction of time that the signal is in an "active" state, which, for a periodic function, may be represented as:

$$\text{duty cycle } D = \tau/T$$

where τ is the duration that the function is non-zero and T is the period of the function. Alternatively or additionally, the power device 118 may vary the amplitude of the pulse-width modulated signal in order to change the average amount of power delivered to the load device 110 while maintaining a constant duty cycle.

The power device 118 may generate any type of pulse-width modulated signal, such as a pulse wave, a square wave, or a rectangular wave. The signal may be considered in an "active" state when the voltage or the current of the signal exceeds a determined threshold. In one example, such as a rectangular wave, pulse width modulation may be provided where the duty cycle is different than ½ or 0.5.

Figure 8:
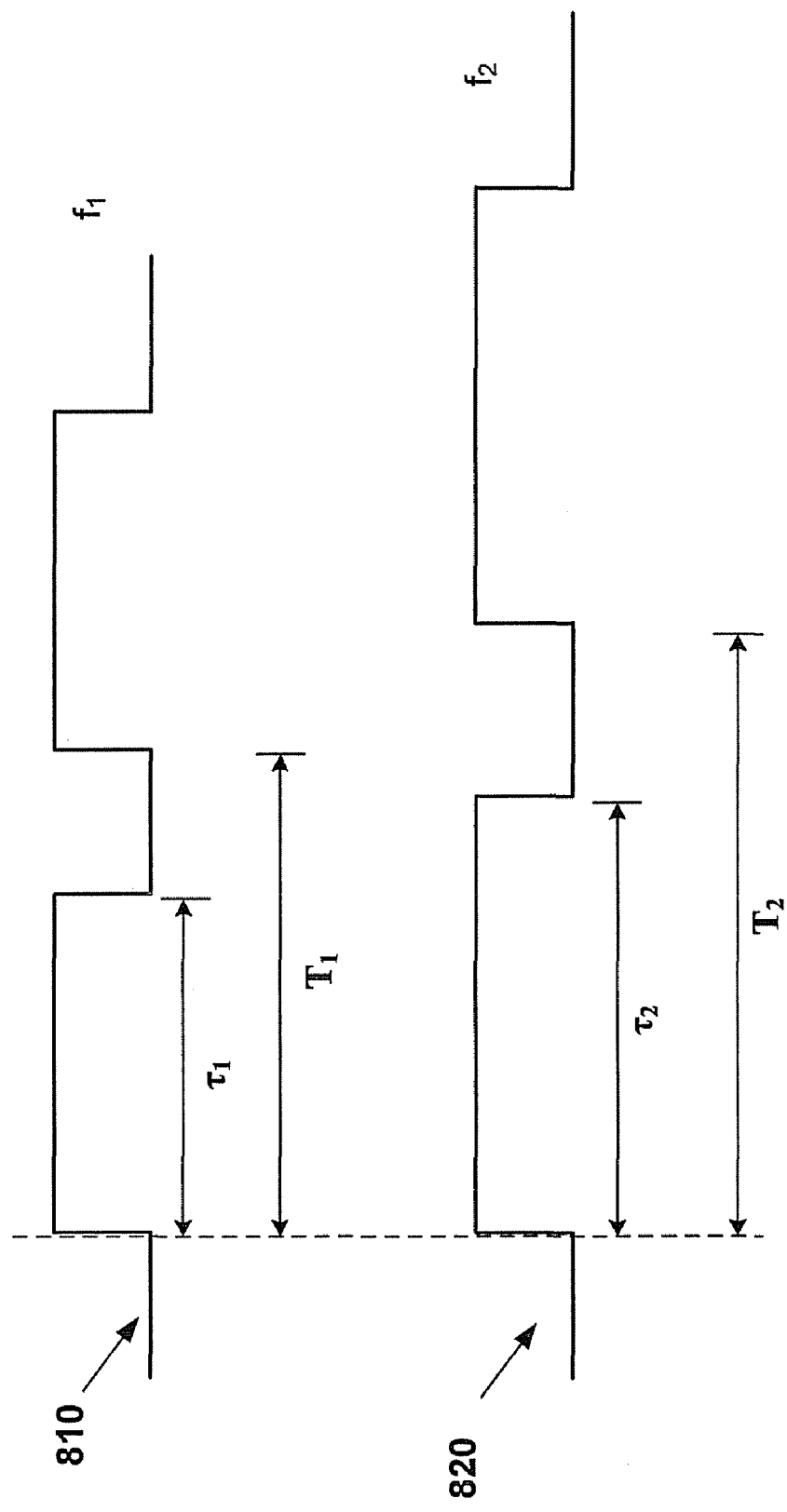
FIG. 8 illustrates two waveforms that have different frequencies, but the same duty cycle.

The power communicator 142 may transmit data to the load device 110 using frequency modulation of the pulse-width modulated signal while maintaining a constant duty cycle in order to deliver a desired average amount of power. For example, the power device 118 may generate n alternate waveforms, where each one of the wave forms has the same duty cycle, but each one of the wave forms has different frequencies. Each one of the alternate waveforms may represent one of n possible states to transmit over the line. Alternatively, different methods of transmitting data may be used. FIG. 8 illustrates two waveforms 810 and 820 that have different frequencies, but the same duty cycle.

The control circuit 124 may detect the frequency of the signal on the line with the input sensor 120. The control circuit 124 may map the detected frequency to a respective one of the n possible states. Thus, the power communicator 142 may transmit information to the control circuit 124.

Figure 9:
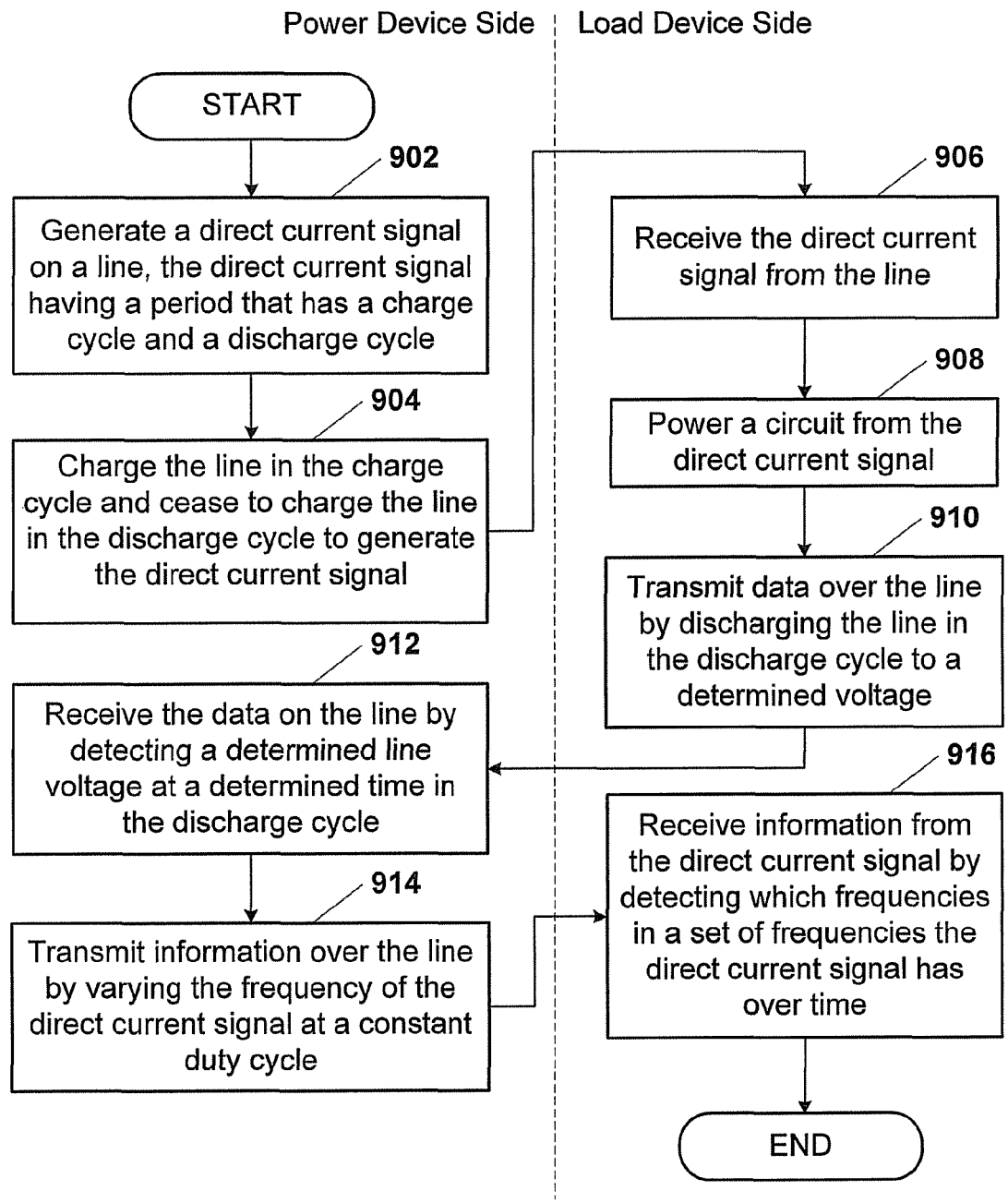
FIG. 9 illustrates one embodiment of a method to transmit data through the discharge of the line during a discharge cycle of a power signal.

FIG. 9 illustrates one embodiment of a method to transmit data through the discharge of the line during the discharge cycle 30 of a power signal. Additional, different, or fewer acts may be performed. The acts may be performed in a different order than illustrated in FIG. 9.

In act 902 of the embodiment illustrated in FIG. 9, the operation may begin by generating the periodic direct current signal on the line. The direct current signal has a period that includes the charge cycle 20 and the discharge cycle 30. Generating the direct current signal includes, in act 904, charging the line in the charge cycle and ceasing to charge the line in the discharge cycle.

The operation may continue in act 906 by receiving the direct current signal from the line. Additionally, the operation may include, in act 908, powering a circuit from the direct current signal. In one example, the circuit may include the control circuit 124. Alternatively or additionally, the circuit may include the load device 110.

In act 910, the operation may include transmitting data over the line by discharging the line in the discharge cycle to a determined line voltage and/or at a determined time. In act 912, the operation may continue by receiving the data on the line by detecting the determined line voltage after the line was discharged and before the line is charged again.

In act 914, the operation may further include transmitting information over the line by varying the frequency of the direct current signal while maintaining a constant duty cycle. The operation may continue in act 916 by receiving the information from the direct current signal on the line by detecting which frequencies in a set of frequencies the direct current signal has overtime.

Figure 10:
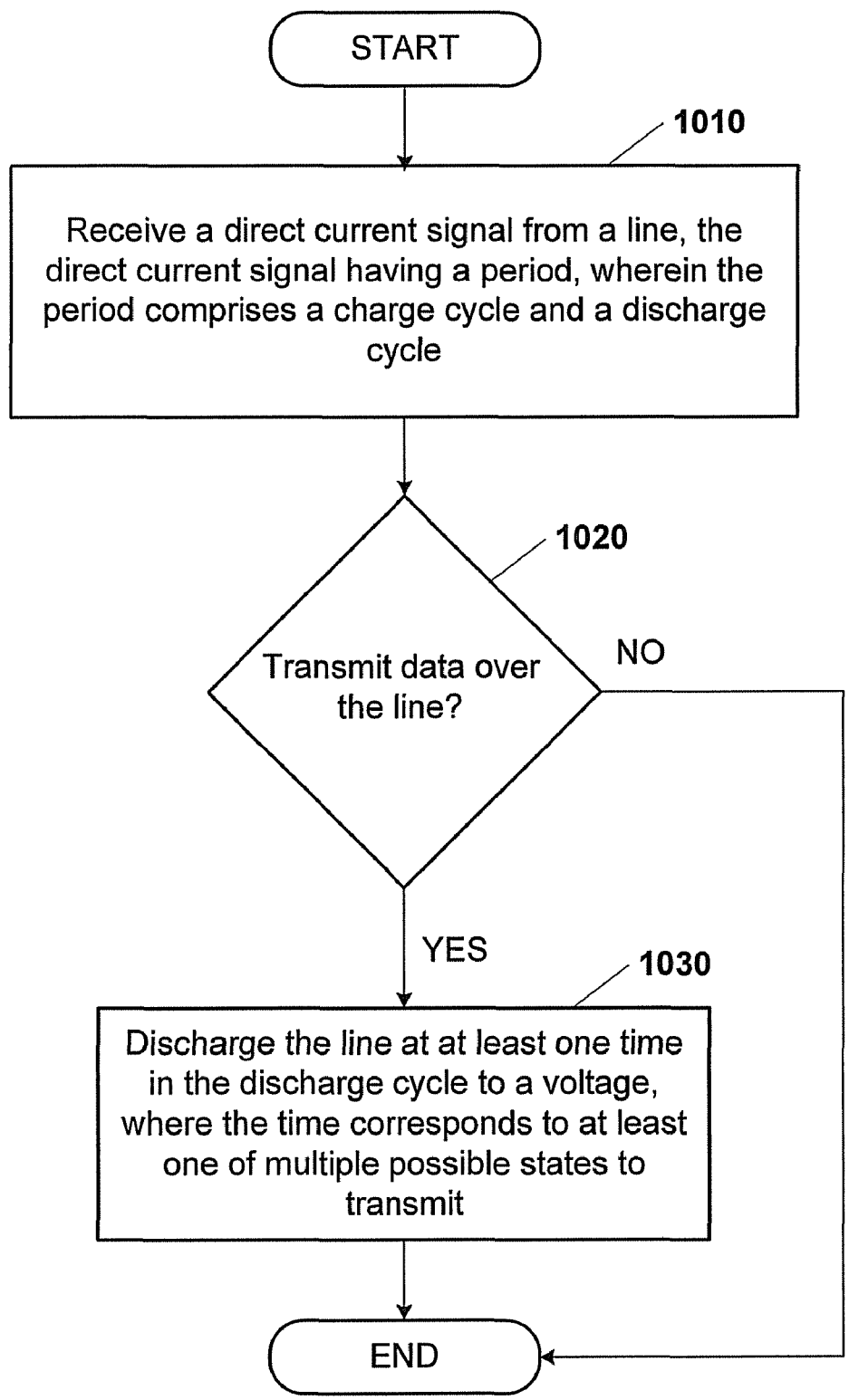
FIG. 10 illustrates one embodiment of a method to transmit data by discharging a line during the discharge cycle of a direct current signal.

FIG. 10 illustrates one embodiment of a method to transmit data by discharging the line during the discharge cycle of a periodic direct current signal. Additional, different, or fewer acts may be performed. The acts may be performed in a different order than illustrated in FIG. 10.

The operation may begin in act 1010 by receiving a direct current signal from the line, Where the direct current signal has a period that includes the charge cycle 20 and the discharge cycle 30. The direct current signal is generated by charging the line in the charge cycle 20, and ceasing to charge the line in the discharge cycle 30. The line may fail to fully discharge to zero volts for at least a portion of the discharge cycle 30.

The operation may also include, in act 1020, determining whether to transmit data over the line. If no data is to be transmitted, the operation may finish. If data is to be transmitted, the operation may continue to act 1030.

In act 1030, the operation may continue by transmitting data on the line by discharging the line at one or more times or levels in the discharge cycle 30 to a determined voltage. The one or more times or levels may correspond to at least one of multiple possible states to transmit.

Figure 11:
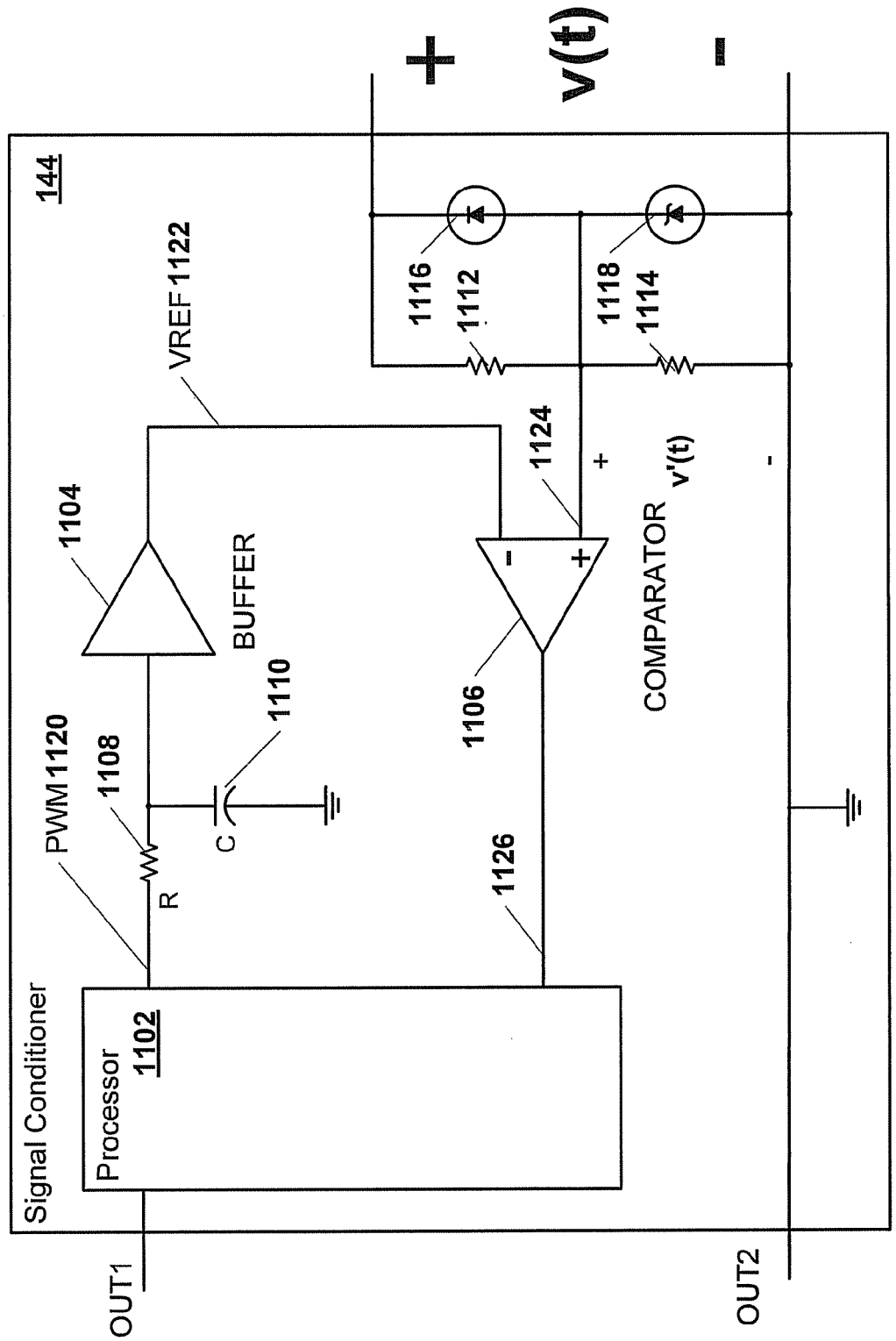
FIG. 11 illustrates an example of a signal conditioner.

FIG. 11 illustrates an example of the signal conditioner 144. In the example illustrated in FIG. 11, the signal conditioner 144 may include a processor 1102, a buffer 1104, a comparator 1106, a first resistor 1108, a capacitor 1110, a second resistor 1112, a third resistor 1114, a diode 1116, and a Zener diode 1118. The processor 1102 may be a general processor, central processing unit, server, application specific integrated circuit (ASIC), digital signal processor, field programmable gate array (FPGA), digital circuit, analog circuit, or combinations thereof. The signal conditioner 144 may be configured to generate the conditioned signal 250 across outputs designated OUT1 and OUT2, respectively. In addition, the processor 1102 may be configured to determine a reference voltage, $V_r$. The reference voltage is a voltage to compare with the line voltage, v(t), or with a voltage derived from the line voltage, in order to determine whether the line was discharged by the load communicator 116. Depending on the length of the line, the devices electrically coupled to the line, and other characteristics of the configuration, the reference voltage that provides the most reliable results may vary from configuration to configuration.

The first resistor 1108 and the capacitor 1110, together with the buffer 1104, may convert a pulse-width modulated signal 1120, designated PWM, to a relatively constant DC signal 1122, which is designated VREF. The voltage of the VREF signal 1122 with respect to ground may be proportional to the duty cycle of the PWM signal. For example, if the PWM signal 1120 has an amplitude of three Volts and a duty cycle of 10 percent, then the VREF signal 1122 may be a relatively constant voltage DC signal of about 300 Millivolts. If the duty cycle of the PWM signal 1120 decreases, then the voltage of the VREF signal 1122 may decrease. Alternatively, if the duty cycle of the PWM signal 1120 increases, then the voltage of the VREF signal 1122 may increase. The characteristics of the first resistor 1108 and 1110 may be selected based on the frequency of the PWM signal 1120.

The second resistor 1112, the third resistor 1114, the diode 1116 and the Zener diode 1118 are configured to convert the line voltage, v(t), into a derived voltage, v'(t), at an input signal 1124 to the comparator 1106. For example, the second resistor 1112 and the third resistor 1114 create a voltage divider to reduce the line voltage, v(t), to the derived voltage, v'(t). The Zener diode 1116 may clamp the derived voltage, v'(t), to avoid overstressing the comparator 1106. The diode 1116 may facilitate the speed of recovery of the line voltage, v(t). In one example, the signal conditioner 144 may not include the second resistor 1112, the third resistor 1114, the diode 1116 and the Zener diode 1118. Alternatively, one or more alternative components may be substituted for one or more of the second resistor 1112, the third resistor 1114, the diode 1116 and the Zener diode 1118.

During operation, the processor 1102 of the signal conditioner 144 may determine the reference voltage, $V_r$, to compare with the derived voltage, v'(t), for a given configuration on the line. For example, during a test sequence, the power communicator 142 may instruct the load communicator 116 to follow a series of predetermined discharges or predetermined lack of discharges over multiple discharge cycles 30. During the test sequence, the processor 1102 may vary the voltage of the VREF signal 1122 by varying the duty cycle of the PWM signal 1120. The chance of an output 1126 of the comparator 1106 accurately reflecting a detection of the corresponding one of the predetermined discharges or predetermined lack of discharges may increase, and then decrease, as the voltage of the VREF signal 1122 varies from low to high. The voltage of the VREF signal 1122 that provides the most accurate detection of the predetermined discharges and/or predetermined lack of discharges may be considered the reference voltage, $V_r$. The processor 1102 may determine when to sample the output 1126 of the comparator 1106 to appropriately generate the conditioned signal 250 as described above.

Once the processor 1102 determines the reference voltage, the processor 1102 may fix the duty cycle of the PWM 1120 to generate the reference voltage on the VREF signal 1122. By using the reference voltage, the signal conditioner 144 may optimally detect data transmitted from the load communicator 116. If desired, the processor 1102 may determine the reference voltage again later by conducting another test sequence. For example, a different load device may be electrically coupled to the line, which could result in a change in the characteristics of the line voltage during the discharge cycle 30.

One advantage of the system 100 to transmit data may be lower power usage than other configurations drawing more power. For example, discharging the line during the charging cycle may waste more power. Also, adding a signal to the line in addition to the power signal may consume more power.

Another advantage of the system 100 is that a single line may be used to transmit data from the load device 110 to the power device 118 and to power the load device 110 by the power device 118.

Different components provide different functions for implementing the functionality of the various embodiments. The respective logic, software or instructions for implementing the processes, methods and/or techniques discussed above are provided on computer-readable storage media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing, and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system. Logic encoded in one or more tangible media for execution is defined as instructions that are executable by the processor and that are provided on the computer-readable storage media, memories, or a combination thereof.

Any of the devices, features, methods, and/or techniques described may be mixed and matched to create different systems and methodologies.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. An apparatus for transmitting data over a line, the apparatus comprising:
   a control circuit configured to receive a direct current signal over the line, the direct current signal being periodic and having a period, wherein the period comprises a charge cycle and a discharge cycle, the direct current signal is generated from a charging of the line for the duration of the charge cycle and a cessation of the charging of the line for the duration of the discharge cycle, and the line fails to fully discharge for at least a portion of the discharge cycle; and
   a switch electrically coupled to the line and to the control circuit, wherein the control circuit is configured to close the switch in the discharge cycle to transmit data over the line, the closure of the switch configured to cause the switch to discharge the line to an extent greater than in absence of a closure of the switch, the closure of the switch during the discharge cycle being detectable as a drop in voltage on the line.

2. The apparatus of claim 1, wherein to discharge the line in the discharge cycle, the control circuit is configured to discharge the line to a determined voltage across the line.

3. The apparatus of claim 1, wherein the switch includes a transistor and the control circuit is further configured to apply a voltage across a gate and a source of the transistor to close the switch in the discharge cycle.

4. The apparatus of claim 1, wherein a load device electrically coupled to the line includes at least one diode, the line fails to fully discharge for at least the portion of the discharge cycle due at least in part to a diode forward voltage drop across the at least one diode.

5. The apparatus of claim 1, wherein the apparatus is powered by the direct current signal.

6. The apparatus of claim 1, wherein the control circuit is further configured to discharge the line at least one of a plurality of predetermined times in the discharge cycle, wherein each one of the predetermined times corresponds to at least one respective state included in a plurality of possible states to transmit.

7. The apparatus of claim 1, wherein the control circuit is further configured to receive information included in the direct current signal, wherein the direct current signal has a constant duty cycle but has different ones of a plurality of frequencies over time, and each one of the frequencies corresponds to a respective portion of the information.

8. A system for receiving data over a line, the system comprising:
   a power device configured to generate a direct current signal on the line, the direct current signal being periodic and having a period, wherein the period comprises a charge cycle and a discharge cycle, wherein the power device charges the line during the charge cycle and does not charge the line during the discharge cycle, and wherein the line fails to fully discharge for at least a portion of the discharge cycle; and
   a power communicator configured to detect a variation in a voltage on the line in the discharge cycle, the variation indicating data received by the power communicator that is transmitted to the power communicator through a discharge of the line in the discharge cycle.

9. The system of claim 8 further comprising a load device, wherein the load device is electrically coupled to the line and the load device is powered from the direct current signal.

10. The system of claim 8, further comprising a load device, wherein the load device is electrically coupled to the line, the load device includes at least one diode, and the line fails to fully discharge for the at least a portion of the discharge cycle due at least in part to a diode forward voltage drop across the at least one diode.

11. The system of claim 8, wherein the power device is further configured to:

set a duty cycle of the direct current signal to transmit a determined average power in the direct current signal;

vary a frequency of the direct current signal to transmit information over the line while the duty cycle of the direct current signal is fixed to transmit the determined average power, wherein a variation in the frequency of the direct current signal represents at least a portion of the information.

12. The system of claim 8, wherein the power communicator is further configured to detect the variation in the voltage on the line based on a determination that a detected voltage of the direct current signal at a determined time is less than a predetermined voltage, and wherein the predetermined voltage is a voltage of the direct current signal at the determined time in the discharge cycle in an absence of the variation in the voltage on the line.

13. The system of claim 8, wherein the power communicator is further configured to detect the variation in the voltage on the line at least one of a plurality of predetermined times in the discharge cycle, wherein each respective one of the predetermined times corresponds to at least one state included in a plurality of possible states to receive.

14. A method comprising:

receiving a direct current signal from a line with a load communicator, the direct current signal having a period, wherein the period comprises a charge cycle and a discharge cycle, the direct current signal is generated from a charging of the line for the duration of the charge cycle and a cessation of the charging of the line for the duration of the discharge cycle, and the line fails to fully discharge for at least a portion of the discharge cycle; and transmitting data over the line with the load communicator by altering a discharging of the line in the discharge cycle with the load communicator so that a voltage on the line is lower than in an absence of the load communicator altering the discharging of the line, wherein the lower voltage on the line represents the data transmitted over the line.

15. The method of claim 14 further comprising powering a circuit from the direct current signal.

16. The method of claim 14, wherein altering the discharging of the line in the discharge cycle includes discharging the line to a determined voltage across the line, the determined voltage corresponding to at least one of a plurality of possible states to transmit.

17. The method of claim 16, wherein altering the discharging of the line to the determined voltage across the line includes discharging the line by closing a switch connected in series with at least one diode, the switch and the at least one diode electrically coupled to the line, wherein a total diode forward voltage drop of the at least one diode is the determined voltage.

18. The method of claim 14, wherein altering the discharging of the line in the discharge cycle includes discharging the line at least one time in the discharge cycle, wherein each one of the at least one time corresponds to at least one of a plurality of possible states to transmit.

19. The method of claim 14, further comprising powering a control circuit and a load device from the direct current signal, the control circuit transmitting the data over the line, the data including information associated with the load device, wherein the control circuit is electrically coupled to the line and the load device is electrically coupled to the line.

20. The method of claim 14, further comprising receiving information from the direct current signal by detecting which ones of a plurality of determined frequencies the direct current signal has over time while the direct current signal maintains a constant duty cycle, wherein each one of the frequencies corresponds to a respective portion of the information.

* * * * *